C. E. SOMERS.
VACUUM MILK RELEASER CHAMBER.
APPLICATION FILED SEPT. 17, 1917.
1,351,192. Patented Aug. 31, 1920.
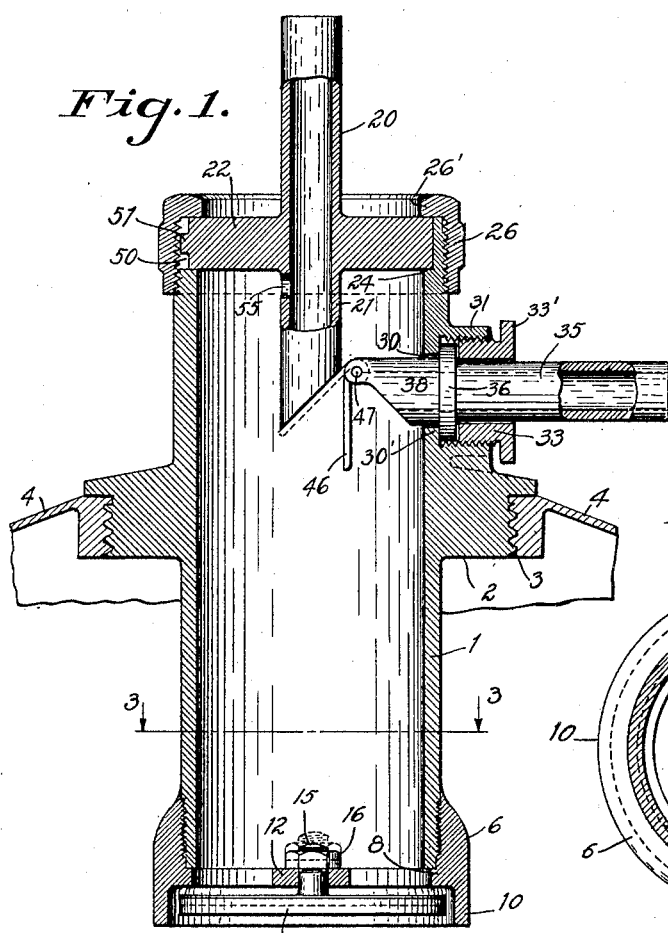
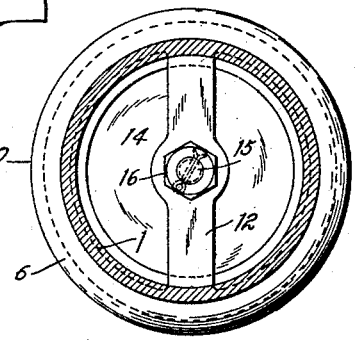
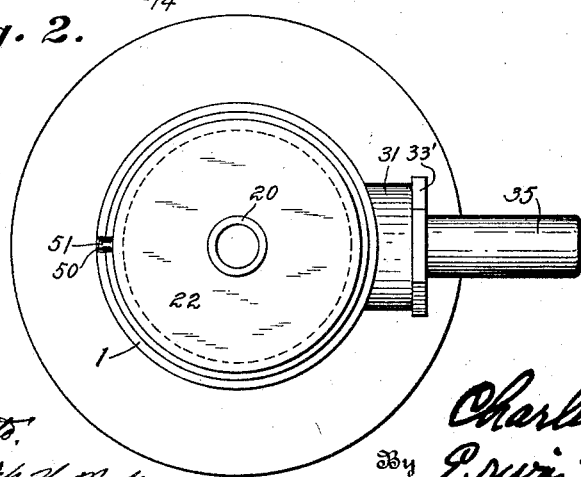
Inventor
Charles E. Somers
By Erwin E. Wheeler
Attorneys
Witness
J. E. Otto
Frederick W. Nolte

UNITED STATES PATENT OFFICE.

CHARLES E. SOMERS, OF MILWAUKEE, WISCONSIN, ASSIGNOR TO B-V MILKING MACHINE COMPANY, OF MILWAUKEE, WISCONSIN, A CORPORATION OF WISCONSIN.

VACUUM MILK-RELEASER CHAMBER.

1,351,192.  Specification of Letters Patent.  Patented Aug. 31, 1920.

Application filed September 17, 1917. Serial No. 191,697.

*To all whom it may concern:*

Be it known that I, CHARLES E. SOMERS, a citizen of the United States, residing at Milwaukee, county of Milwaukee and State of Wisconsin, have invented new and useful Improvements in Vacuum Milk-Releaser Chambers, of which the following is a specification.

My invention relates to improvements in vacuum releaser chambers for milking machines.

The object of my invention is to provide a simple, efficient, inexpensive and perfectly sanitary releaser chamber.

It is essential to perfect sanitation that the milk be kept out of the suction pipe, such pipes being frequently of considerable length and connecting with a pump or with a pulsator mechanism. If milk is allowed to enter these pipes, it is practically impossible to keep them clean under ordinary farm conditions. In fact the difficulty in cleaning such pipes causes the ordinary farmer to neglect them to a large extent. My invention therefore contemplates the provision of adequate means for preventing the milk from entering the suction pipe either on account of splashing or by allowing particles of milk to become entrained with the air that is being withdrawn through such pipe.

Another requirement for perfect sanitation is that all parts of the releaser chamber be easily accessible and that the surfaces be of such contour that they may readily be cleaned. My invention therefore contemplates the complete removal of the valves and valve supports and fittings during the operation of cleansing the chamber, and the provision of intermediate walls which are smooth and easily accessible. I also contemplate constructing the removable parts in such a manner as to insure their accurate replacement relative to each other after a removal thereof for cleaning or inspecting purposes.

In the drawings;

Figure 1 is a central vertical sectional view of my improved releaser chamber, showing the parts in position for use, and also showing a fragment of the upper portion of a milk receiving pail or container.

Fig. 2 is a top view thereof as it appears when removed from the pail, and with the upper retaining ring removed.

Fig. 3 is a sectional view drawn on line 3—3 of Fig. 1.

Like parts are identified by the same reference characters throughout the several views.

The casing 1 is preferably cylindrical and has substantially a smooth bore but it is provided with an exterior flange 2 extending radially from the outer wall. This flange is screw threaded at 3 to facilitate connecting it with the top of a milk pail or other fluid container 4, to which my releaser chamber is adapted to be attached. The lower end of the casing is also exteriorly screw threaded and adapted to receive a collar 6. A flange 8 extends partially underneath the lower margin of the casing and is adapted to fit snugly against the said margin when the collar is in position as shown in Fig. 1, thus providing an air and liquid tight joint. This collar is preferably formed with a depending annulus 10, preferably of a diameter larger than that of the casing 1. The collar also carries a diametrically positioned cross bar 12 which may be formed integrally with the annular flange 8.

A disk valve 14 is suspended from the cross bar 12 by a centrally disposed post 15 projecting through an aperture in the cross bar 12. This post may be formed integrally with the disk or permanently connected therewith. It is threaded at its upper end to receive a nut 16 which is so positioned with respect to the cross bar as to allow a limited vertical movement of the valve and post, whereby, in its raised or closed position, the valve may seat against the flange 8. In its lowered position, the valve may be suspended at a slight distance from the seat, thus allowing deliveries of milk from the releaser chamber to the receiving pail. The nut, in the first position above mentioned, is raised away from the cross bar 12 (as shown by dotted lines in Fig. 1), and in the lowered, or last mentioned, position it rests on the cross bar and limits downward movement of the valve. The degree of movement of the valve may therefore be conveniently regulated by turning the nut either upwardly or downwardly on the post 15 to such a position that the valve will quickly close upon the first inrush of air caused by a vacuum in the chamber 1, while also allowing a quick outlet of milk when the vacuum is relieved.

It will be seen that when air is withdrawn from chamber 1, air will tend to enter the chamber between the flange 10 and the edge of the valve, but this upward movement of the air will carry the valve with it to closing position. When the vacuum is relieved, the valve will drop away from its seat to an extent sufficient to permit a free discharge of the milk from the chamber.

Air is withdrawn from the chamber through a nipple or duct 20, which has an extension 21 projecting downwardly into the releaser chamber through a removable cap 22 seating upon a shoulder 24 formed in the upper part of the casing 1. This cap 22 closes the upper end of the chamber and is firmly held in air tight relation thereto by an external ring 26 adapted to screw down over the casing and having an inturned flange or lip 26' extending over the upper margin of the casing and bearing upon a portion of the flange 22, as best shown in Fig. 1. The outlet duct 20, including the portion 21, and the cap 22 may be formed integrally if so desired. It will be understood that the duct 20 is adapted to be connected with suction apparatus, as is common practice, by a rubber hose or other flexible connection, (not shown).

The casing 1 is also apertured at 30 and provided with a tubular boss 31 encircling the aperture and projecting outwardly. This boss may form an integral part of the flange 2. The boss 31 is interiorly screw threaded and is adapted to receive a packing nut 33 having a head portion 33' whereby it may be easily unscrewed and removed from the annulus.

Packing nut 33 is centrally apertured to receive a coupling member or fitting 35 to which a flexible hose or other connection leading from the teat cups may be applied, and the coupling member has a bearing flange 36 adapted to abut the shoulder 30' formed between the inner wall of the annulus and the port or aperture 30. This bearing flange and the coupling to which it is attached are securely held in place against the shoulder 30' by the pressure applied by the packing nut 33.

The portion 38 of this coupling member extends into the releaser chamber along an axial line which intersects the axis of the air outlet duct 20, 21, and the inner ends of the duct extensions 38 and 21 are obliquely faced downwardly and divergently from a common apex or angle where the planes of these faces intersect substantially at the top line of the portion 38. A disk shaped valve 46 is hinged to the inner end of portion 38 near the apex of this angle, the hinge pin or bolt 47 being so located that the valve may seat interchangeably upon either of said oblique faces or margins of the members 38 and 21. The valve is therefore adapted to swing to a position closing the lower end of duct 21 under the impact of milk entering through duct 38 and it is also adapted to swing in the other direction and close duct 38 under the impact or pressure of air entering the chamber through duct 21.

In order that the air outlet duct of my improved releaser chamber may assume its correct position after a removal thereof, I provide the upper marginal portion of the casing with a groove or slot 50 into which a pin 51 on the cap 22 is adapted to project when the cap and its associated parts are in correct position as shown in Fig. 1. In this manner the duct 21 is held in position for the valve 46 to seat accurately upon the oblique end of the milk inlet duct 38, as well as upon the end of duct 21. The milk inlet duct may be rotatively adjusted and inspected preparatory to clamping it in position by the packing nut 33. It is therefore not so material that this duct be doweled in position, as in the case of the air outlet.

The operation of my improved releaser chamber is as follows:

Intermittent suction will be applied in the usual manner to the outlet coupling 20. The coupling member 35 will have previously been connected with the teat cups and these cups adjusted in position for use. During the suction interval, the valve 46 will be drawn to the position shown by dotted lines in Fig. 1, partially by the rush of air through the duct 21, and partially by the impact of the milk and air from the milk inlet duct 38. When in this position, the valve 46 shuts off all further egress of air through the oblique end of the duct or fitting 21, but I provide a small aperture 55 in this duct directly below the head flange 22 and on the opposite side of the duct from that where the milk enters, thereby permitting a further withdrawal of air from the releaser chamber, teat cup, etc. Owing to the small size of the aperture 55 there will be a greater degree of vacuum in the duct 21 than there is in the interior of the releaser chamber after valve 46 has closed upon the lower end of said duct. This not only provides means for holding the valve to its seat, but it also relieves the suction pull upon the teats during the final portion of the suction period, since the flow of milk into the releaser chamber, together with any air from the teat cups entrained therewith tends to relieve the vacuum in the releaser chamber. This is a great advantage, for it relieves the strain upon the teats after the flow of milk has been started by a strong initial suction prior to the closing movement of valve 46, above described. It also permits a reduction in the velocity of the milk, which would otherwise enter the releaser chamber with such force as to make it almost impossible to avoid splashing to all parts of the chamber. This tendency of the milk to splash has heretofore made it extremely difficult, and in fact virtually impossible to prevent some particles of milk from entering the air outlet or suction duct. I have discovered that by providing a valve 46 which is adapted to close the main inlet to the suction duct, and by subsequently withdrawing the air more slowly through the port 55, the velocity of the milk stream in the milk inlet duct may be very materially reduced, the friction of the walls of the duct contributing to this result. The reduction of velocity apparently takes place before any of the milk reaches the releaser chamber, or at least before it has acquired a high velocity, it being understood that in any milking machine that employs a releaser chamber the velocity of the milk tends to accelerate from the beginning to the end of the suction period if the maximum degree of vacuum is maintained. I have discovered, however, that by my improvement the velocity of the milk may be diminished and may at all times be kept low enough to prevent splashing into the air outlet duct, or into the vicinity of port 55, and I am satisfied that a better discharge of milk is attained with less strain upon the teats. When the suction is relieved and air allowed to return to the releaser chamber valve 46 will swing to closing position upon tubular member 38 in time to maintain a sufficient vacuum in the teat cups to insure their retention upon the teats.

Substantially simultaneously with the application of suction to the releaser chamber, the valve 14 will be drawn upwardly, as above explained, thereby preventing the ingress of air from the milk pail or receiver, whereupon a vacuum of considerable intensity may be established in the releaser chamber, this vacuum extending through the teat cup passages to the teat cups, and causing a discharge of milk through the coupling 35 and duct 38 into the releaser chamber. It will be noted that air rushing upwardly between the walls of the annulus 10 and the valve 14 will materially quicken the action of the valve in closing when a vacuum is established in the chamber, but this annulus is not absolutely necessary as the upward pressure of the air upon the disk alone can be relied upon to close the valve.

When the vacuum is relieved, either by reason of the return stroke of the pump piston, or the admission of air from any other source to the air pipe and coupling 30, the rush of air through the duct 21 into the chamber 1, and out of the chamber through duct 38, will cause the valve 46 to swing across the neutral position to its seating position against the inclined face of the duct 38, thereby preventing air from passing to the teat cups to a sufficient extent to entirely relieve the vacuum in such cups. In this manner, I am able to maintain a sufficient vacuum in the cups to retain them in position upon the teats without employing auxiliary supports.

When the vacuum is relieved in chamber 1, the valve 14 will drop from its seat to the suspended position shown in Fig. 1, thereby permitting a discharge of milk from the chamber 1 into the receiver or pail into which the casing 1 is partially screwed.

To clean my improved releaser chamber, it is merely necessary to unscrew the collar 6, thereby removing the integral cross bar and the suspended disk valve 14. The valve may either be cleaned while attached to the cross bar, or it may be removed therefrom by unscrewing the nut 16. The air outlet coupling and the fitting 21 can be removed by unscrewing ring 26 and lifting the cap 22 out of its seat in the casing 1. By removing the packing nut 33, the milk inlet duct 38 may be removed through the port 30, this duct carrying with it the plate valve 46. The chamber will thereupon be left entirely open, with its interior wholly unobstructed. The openings provided by the removal of the fittings facilitate passing a cleansing fluid through the chamber and also permit a ready inspection of the entire inner surface thereof.

I claim:—

1. In a milking machine, the combination of a releaser chamber provided with a valved outlet and a milk inlet, of an air outlet duct leading from the upper portion of said chamber, open at its lower end and having a smaller opening at one side, and means for substantially closing the end of said duct during the final portion of a suction period.

2. In a milking machine, the combination of a releaser chamber provided with a valved milk outlet port, and having near its upper end removable milk inlet and air outlet ducts communicating with the interior of said chamber, means for closing the milk inlet duct when the outlet port is open, and means for partially closing the air outlet duct when the milk outlet port is closed.

3. In a milking machine, the combination of a releaser chamber provided with a valved milk outlet portion and also having a milk inlet port, a suction duct extending through one wall of the chamber, and a valve adapted to partially close the suction duct during a period of air withdrawal therethrough, said valve when closed being adapted to obstruct the withdrawal of air through said duct sufficiently to allow a reduction of the vacuum in the releaser chamber during a suction period by the admission of milk and air to said chamber from the teat cups.

4. In a milking machine, the combination of a releaser chamber provided with a valved milk outlet port, a set of converging ducts projecting through the walls of said chamber near its upper end, and adapted to serve as milk inlet and air outlet ducts respectively, a swinging valve adapted to alternately close the inner ends of said ducts, the ends of said ducts being faced off, each in a plane which said valve assumes when swung to closing position thereon, one of said ducts being also provided with an aperture through which air may pass from the releaser chamber into the duct after the valve has been closed upon the end thereof.

5. In a milking machine, the combination of a releaser chamber provided with a valved milk outlet port, a set of converging ducts projecting through the walls of said chamber near its upper end, and adapted to serve as milk inlet and air outlet ducts respectively, a swinging valve adapted to alternately close the inner ends of said ducts, the ends of said ducts being faced off each in a plane which said valve assumes when swung to closing position thereon, one of said ducts being also provided with an aperture through which air may pass from the releaser chamber into the duct after the valve has been closed upon the end thereof, and means for detachably coupling said ducts to the releaser chamber adapted to permit a removal of the ducts and valve to facilitate cleansing the same.

6. In a milking machine, a vacuum releaser chamber having a milk outlet port in combination with a milk inlet duct and an air outlet duct, each having obliquely faced open ends arranged to form substantially an inverted V, and a valve suspended from one of the ducts and adapted to seat upon the ends of the ducts in alternation.

7. In a milking machine a vacuum releaser chamber having milk inlet, air outlet, and milk outlet ports, of a valve for the milk outlet port, adapted to close when suction is applied to the chamber to reduce the pressure within the chamber below atmospheric pressure, and a valve for the milk inlet port adapted to close when the vacuum is relieved in the chamber, said valve being adapted to partially close the air outlet port and to deflect milk therefrom.

8. In a milking machine a vacuum releaser chamber having a milk inlet and a milk outlet, in combination with a removable air outlet fitting comprising a tubular coupling member having an inclined valve seat at its lower end and provided with an integral cap for the chamber, doweling means for positioning the cap and a ring removably secured to the top of the chamber in pressure contact with the cap.

9. In a milking machine, a releaser chamber provided with removable air outlet and milk inlet fittings extending into the chamber adapted to be non-rotatably adjusted into and out of position upon the walls of said chamber, and means exterior to the chamber for detachably connecting said fittings to the chamber wall, adapted to engage and hold the fittings to the wall under clamping pressure, in their positions of proper adjustment.

10. In a milking machine, a releaser chamber provided with removable air outlet and milk inlet fittings extending into the chamber, means exterior to the chamber for detachably connecting said fittings thereto, and a valve connected with one of said fittings and removable therewith.

11. In a milking machine, the combination with a releaser chamber having milk inlet, air outlet, and milk outlet ports, of a valve for the milk outlet port, adapted to close inwardly, and a valve for the milk inlet port adapted to close when the vacuum is relieved in the chamber, said valve being arranged to also cover the air outlet port when air is withdrawn from the chamber.

12. In a milking machine, the combination with a releaser chamber having milk inlet, air outlet, and milk outlet ports, of a valve for the milk outlet port, adapted to close inwardly, and a valve for the milk inlet port adapted to close when the vacuum is relieved in the chamber, said valve being arranged to also cover the outlet port when air is withdrawn from the chamber, together with means for allowing a relatively slow withdrawal of additional air after the air outlet port is closed by said valve.

13. In a milking machine, a tubular releaser chamber open at both ends and having a shoulder at its upper end to receive a cap, a cap adapted to fit said shoulder, exterior means for clamping the cap in position, a tubular member extending through the cap and adapted to serve as an air outlet, a milk outlet valve adapted to close the lower end of the chamber, and a milk inlet duct leading to the interior of the chamber, said milk inlet duct being also removable and provided with exterior detachable means for clamping it in position, said cap being provided with positioning means, and the clamping devices being adapted to secure the cap and milk inlet duct in proper positions without rotative adjustment of the cap, and either with or without rotative adjustment of the milk inlet duct.

14. In a milking machine, a tubular releaser chamber open at both ends and having a shoulder at its upper end to receive a cap, a cap adapted to fit said shoulder, exterior means for clamping the cap in position, a tubular member extending through the cap and adapted to serve as an air outlet, a milk outlet valve adapted to close the lower end of the chamber, and a milk inlet duct leading to the interior of the chamber, said milk inlet duct being also removable and provided with exterior detachable means for clamping it in position, means for positioning the cap relatively to the milk inlet duct, and a valve carried by said duct and adapted to seat either upon the inner end of said duct or upon the inner end of the tubular air outlet member.

15. In a vacuum releaser chamber for milking machine, the combination with a vacuum chamber open at its lower end, a collar adapted to be secured to said lower end, said collar having a valve seat and a cross bar therein, a disk valve having an upwardly projecting extension, and a connecting member adapted to secure the valve to the cross bar and permitting limited vertical movement of the valve.

16. In a milking machine, the combination with a vacuum chamber open at its lower end, a collar having a valve seat therein adapted to fit over the lower end of the vacuum chamber, a cross bar carried by the collar above the valve seat, a valve having a centrally disposed stem mounted to slide in the cross bar, and adapted for limited movement therein.

17. In a milking machine, the combination with a vacuum chamber, open at its lower end, a collar having a valve seat therein adapted to fit over the lower end of the vacuum chamber, a cross bar carried by the collar above the valve seat, a valve having a centrally disposed headed stem mounted to slide in the cross bar, and adapted to allow the valve to drop freely by gravity until the head of the stem strikes said cross bar, and a depending annular flange connected with said collar, and inclosing the valve in such proximity thereto to allow the valve to be quickly carried to its seat when air is withdrawn from said chamber.

18. In a milking machine, the combination with a vacuum chamber open at its lower end, a collar having a valve seat therein adapted to fit over the lower end of the vacuum chamber, a valve suspended from the collar adapted for limited movement therein, said chamber being also provided with removable coupling fittings adapted for connection with the milk inlet and air outlet passages respectively, and a valve adapted when in one position to seat against the inner end of the milk inlet fitting, and when in the other position to seat against the inner end of the air outlet fitting and preventing milk from entering the air outlet, said valve stem being headed to limit the downward movement of the valve, and said valve being free to drop by gravity until the head of the stem strikes the cross bar.

19. In a milking machine, the combination with a vacuum chamber open at its lower end, a collar having a valve seat therein adapted to fit over the lower end of the vacuum chamber, a valve suspended from the collar adapted for limited movement therein, said chamber being also provided with removable coupling fittings adapted for connection with the milk inlet and air outlet passages respectively, and a valve adapted when in one position to seat against the inner end of the milk inlet fitting, and when in the other position to seat against the inner end of the air outlet fitting and preventing milk from entering the air outlet, said air outlet also having an aperture near the point of exit from the chamber, adapted to permit an additional withdrawal of air after the valve has closed the end thereof.

In testimony whereof I affix my signature in the presence of two witnesses.

CHARLES E. SOMERS.

Witnesses:
LEVERETT C. WHEELER,
O. C. WEBER.